US011920758B2

(12) United States Patent
Monpremier et al.

(10) Patent No.: US 11,920,758 B2
(45) Date of Patent: Mar. 5, 2024

(54) SYSTEMS AND METHODS FOR LED LENS HEATING

(71) Applicant: Panor Corp., Hauppauge, NY (US)

(72) Inventors: Mike Monpremier, Baldwin, NY (US); Raymond Sassoon, Great Neck, NY (US)

(73) Assignee: PANOR CORP., Hauppauge, NY (US)

( * ) Notice: Subject to any disclaimer, the term of this patent is extended or adjusted under 35 U.S.C. 154(b) by 0 days.

(21) Appl. No.: 17/749,943

(22) Filed: May 20, 2022

(65) Prior Publication Data

US 2022/0349549 A1 Nov. 3, 2022

Related U.S. Application Data

(63) Continuation of application No. 16/819,697, filed on Mar. 16, 2020, now Pat. No. 11,339,947.

(60) Provisional application No. 62/821,728, filed on Mar. 21, 2019.

(51) Int. Cl.

| | |
|---|---|
| ***F21S 45/60*** | (2018.01) |
| ***F21V 19/00*** | (2006.01) |
| ***F21V 23/04*** | (2006.01) |
| ***F21V 29/90*** | (2015.01) |
| *F21Y 115/10* | (2016.01) |

(52) U.S. Cl.

CPC ............ *F21S 45/60* (2018.01); *F21V 19/003* (2013.01); *F21V 23/045* (2013.01); *F21V 29/90* (2015.01); *F21Y 2115/10* (2016.08)

(58) Field of Classification Search

None

See application file for complete search history.

(56) References Cited

U.S. PATENT DOCUMENTS

| | | | | |
|---|---|---|---|---|
| 4,728,775 A ‡ | 3/1988 | Van Straten | B60S 1/603 | 219/202 |
| 7,914,162 B1 ‡ | 3/2011 | Huang | F21V 3/04 | 362/92 |
| 2010/0219758 A1 * | 9/2010 | Melzner et al. | B60Q 1/2626 | 219/202 |
| 2019/0297688 A1 * | 9/2019 | Parachini et al. | F21V 29/90 | 362/249.02 |

* cited by examiner
‡ imported from a related application

*Primary Examiner* — Ashok Patel

(74) *Attorney, Agent, or Firm* — Brown Rudnick LLP; Ian G. DiBernardo

(57) ABSTRACT

Disclosed herein are systems and methods for melting cold weather related obstructions (snow, ice, frost, etc.) off of vehicle lamps by heating the lens of the housing, thus restoring the normal operating abilities (e.g., brake light illumination, running light illumination, turn signal illumination). This can allow for an efficient signaling process (e.g., to the following vehicle), thus raising the general level of safety on the roads.

17 Claims, 18 Drawing Sheets

SYSTEMS AND METHODS FOR LED LENS HEATING

RELATED APPLICATIONS

This application claims the benefit of U.S. Provisional Application No. 62/821,728, filed Mar. 21, 2019, which is incorporated by reference herein in its entirety.

BACKGROUND

Taillights (e.g., those sold by the present applicant under the Maxxima brand) have been in use in automotive applications for many years. Taillights are used to alert a driver of a vehicle behind the signaling vehicle (i.e., the vehicle whose taillights are illuminated) of various impending vehicle operations such as, but not limited to, braking of the signaling vehicle and/or turning of the signaling vehicle.

In cold weather environments, snow, ice, and/or frost may accumulate onto the exterior surface of a taillight lens of the signaling vehicle and may impede a following vehicle's ability to detect impending operations of the signaling vehicle. Partial or full blockage of the taillights may occur if the obstructions are not removed. This blockage may lead to accidents and will generally decrease the level of safety on the roads with multiple vehicles in line.

SUMMARY

Disclosed herein are LED lamps that include a heating mechanism implemented within the light housing, which can melt cold weather-related obstructions (e.g., snow, ice, and/or frost) off the exterior surface of the lens. Embodiments of the invention can provide relatively even heating of the lens surface, and can allow for efficient energy consumption, complex inner lens optic design, LED lifespan retention, and/or resistor overdrive capabilities.

The heating mechanism utilizes a microcontroller and multiple resistors that can be operated at maximum potential, thus producing the most possible heat. The heat transfers from the resistors first via convection through the interior environment of the lens and then via conduction through the lens and into any exterior obstructions. Accordingly, snow, ice, and/or frost accumulation can be melted off of the lamp's exterior surface, restoring full operational capability.

Software is also disclosed, which can control the power through the resistors based on variables such as incoming voltage, ambient temperature, and internal temperature. An algorithm is provided to estimate the ambient temperature based on readings of multiple temperature sensors placed inside the lamp. The power can be limited to a preferred rating utilizing pulse width modulation.

The present disclosure refers primarily to taillights, also known as stop/tail/turn (STT) lights; however, the systems and methods described herein are also applicable to different types of vehicle lamps, such as, but not limited to, head lights and work lights. In addition, the present disclosure refers primarily to lamps configured for use in commercial vehicles such as trucks, but those skilled in the art will recognize that the systems and methods described herein may be applied to other LED illumination applications where a heated lens may be desirable.

Additional features and advantages of the present invention are described further below. This summary section is meant merely to illustrate certain features of embodiments of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of certain embodiments of the application, will be better understood when read in conjunction with the appended drawings. For the purposes of illustrating the systems and methods of the present application, there are shown in the drawings preferred embodiments. It should be understood, however, that the application is not limited to the precise arrangements and instrumentalities shown. In the drawings.

DETAILED DESCRIPTION

Figure 1:
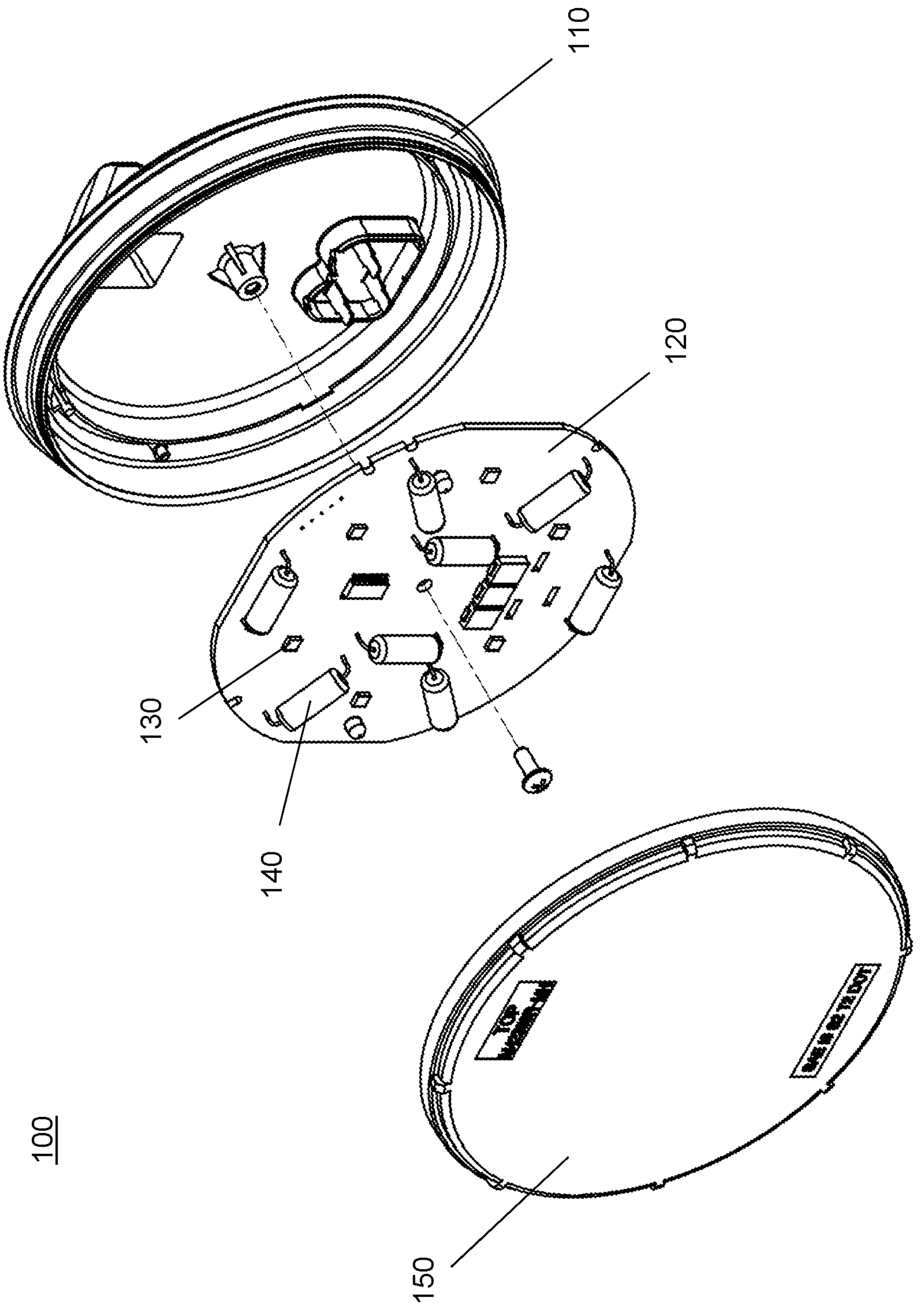
FIG. 1 shows an exploded view of an illustrative 4-inch round STT lamp with heated lens technology, according to various embodiments of the invention.

In traditional vehicle lamps, which are incandescent, halogen, or high intensity discharge, a significant amount of heat is emitted, which melts ice and snow that accumulates on the exterior lens. By contrast, LED vehicle lamps emit a fraction of the heat of traditional vehicle lamps. Thus, one of the main problems of LED vehicle lamps is the buildup of ice and snow on the exterior lens surface, which adversely affects the light emission onto the road. This can cause decreased visibility and can result in severely hazardous driving conditions.

Current technology for removal of cold weather-related obstructions consists of either an electrical wiring technique or a heatsink method utilizing strategic placement of heatsinks within the light housing. Both operations have advantages and disadvantages.

The electrical wiring technique utilizes small wires placed onto the lens of the taillight. Current is passed directly through these wires and heat is produced. The wires are placed directly onto the interior surface of the lens, therefore the heat from the wires transfers directly into the lens and then begins to heat any cold weather-related obstructions on the exterior surface via conduction. This process is efficient, as the power sent into the wires is converted into heat and directly transferred into the exterior obstructions. This process also provides good heater coverage, as the wire placement can be modified to allow for maximum efficiency. However, due to the complex nature of the wiring arrangements on the lens interior surface, the design of inner lens optics is limited severely, reducing the ability to optimize the LED photometric performance with a lens optic. Furthermore, this method requires an advanced and complex manufacturing technique to apply the thin wire onto the lens.

The heatsink method consists of the strategic placement of one heatsink into the light housing. The heatsink is used in conjunction with a self-regulating heater coin. The power from the vehicle energizes the self-regulating heater coin and then powers the heatsink. The heater coin will always heat up to its preset temperature and the heat will then transfer throughout the interior of the light and then through the exterior lens. Because the heating element is placed on the circuit board within the light, complex lens optics are possible. This method also allows for a wide range of design iterations. The manufacturing process is also easier for this process than the other designs. However, in this method the heatsink is placed in one location and thus produces poor heat spread. This poor heat spread prevents the lens from heating evenly and may result in only partial exterior obstruction heating and removal. This method also requires that the heater is always on, creating a source of unnecessary power draw from the vehicle, reducing the LED lifespan and the overall vehicle efficiency.

Embodiments of the present invention overcome the above-identified problems with existing heating technology, and provide improved systems and methods for heating the exterior lens of LED lamps, which can prevent snow and ice buildup and result in continuous light emission onto the road. For example, methods are described herein for melting cold weather-related obstructions off of vehicle taillights by heating the lens from within the light housing, thus restoring the normal operating abilities of the taillight throughout all taillight operations (e.g., brake light illumination, running light illumination, turn signal illumination). This heating/de-icing feature can increase visibility in all weather conditions for the vehicle operator as well as other drivers on the road. Initially, the heating feature may be in test mode, whereby it activates, for example, on the first six startups lasting longer than two minutes (or other number/duration). Afterward, under normal operating conditions, the heating feature may be automatically enabled at or below a temperature, for example, of 45 degrees Fahrenheit (or other preset temperature). Lamps equipped with this heating feature can preferably operate at cold temperatures, for example, of about −30 degrees Celsius.

Embodiments of the present invention utilize a plurality of resistors in order to heat the interior of the light. In some embodiments, wire wound or metal oxide resistors may be used as these resistors exceed the performance of their metal film and carbon film resistor counterparts across a range of variables including power rating, voltage rating, overload capabilities, power surges, and high temperature resistance. Wire wound or metal oxide resistors can also provide high levels of heat when in operation. In other embodiments, different types of resistors may be used to generate heat, such as, but not limited to, thick film resistors. In certain illustrative embodiments, eight resistors are utilized; however, in other embodiments, different numbers of resistors (more or fewer) may be utilized. The resistors can be placed strategically on the circuit board (PCB) to provide the best heating performance. Strategic placement of the resistors can allow for maximum heat spread within the light housing, and can provide even heating of the exterior obstructions.

A resistor produces its maximum convective heat when it is operated at its maximum potential. In order to control (e.g., facilitate maximum heat production from) the resistors, a microcontroller (MCU) may be placed within the light housing and regulates the amount of power sent into the resistors. A typical road vehicle produces between 10.5 volts and 15 volts of power at any given moment. Due to this large variation in voltage, a resistor cannot safely be installed into a light without the resistor being either overpowered or underpowered. The MCU can monitor the amount of voltage that is travelling through the resistor. It is important that the resistor is supplied with the proper amount of voltage at all times. If too little voltage is applied, the resistor will be underpowered and will not operate at its maximum potential (e.g., produce the heat that it is capable of). If too much voltage is passed through the resistor, the resistor will be overpowered and may overheat, causing damage to itself and to its immediate surroundings. The MCU can monitor the voltage entering the light from the vehicle and can then regulate the voltage sent to the resistors accordingly. Thus, the MCU can ensure that the voltage sent into the resistors is always set to a safe and efficient level. In various embodiments of the present invention, pulse width modulation (PWM) may be used to accomplish this task. This process involves limiting the average voltage entering the system by manipulating the frequency of the incoming voltage. While this process cannot increase the voltage in a system, it can limit it and thus prevent overpowering the resistors.

The MCU can also be used to overdrive the resistors. Theoretically, a resistor can be used at any combination of voltage and current (within reasonable limits) so long as it is operating below its dissipating power rating. This dissipating power rating (wattage rating) indicates how much power the resistor can convert into heat or can absorb without damage to itself. Power ratings for through-hole resistors are generally recorded for an ambient temperature of 70 degrees Celsius. Therefore, at cold temperatures the MCU will overdrive the resistors. Overdriving the resistors is when more power is sent into the resistors than the specifications indicate as the maximum. This process will produce more resistance and in turn more heat than the resistors have been certified to produce. In some embodiments, the resistors utilized are 47 ohm resistors. The 47 ohm resistors can operate at 2.34 watts of power at a voltage of 10.5 volts. At a peak voltage of 14.5 volts, the resistors can operate at 4.47 watts of power. The calculation used to determine these values is the power equation $P=V^2/R$.

In conjunction with the voltage regulation, the MCU can also monitor (e.g., continuously read temperatures from) multiple temperature sensors placed within the housing. In certain illustrative embodiments, six separate temperature sensors are utilized; however, in other embodiments, different numbers of temperature sensors (more or fewer) may be utilized. In some embodiments, four temperature sensors are placed directly onto the PCB and can monitor temperatures along the PCB surface. The remaining two temperature sensors are placed above the PCB, near the internal surface of the lens. These two sensors work in conjunction with the other four sensors to determine the temperature at various points around the light's interior. These sensors record their respective data and save the values into the EEPROM. The MCU can utilize these values for various operations executed via the MCU code. Software (detailed further below) can determine the exact settings that the heaters must enter in order to perform at their optimum ability. When the MCU determines that all settings have been correctly recorded, the light's heating mechanism will activate. The heating mechanism will preferably only activate when a range of values (detailed further below) have been correctly recorded.

When the heaters (resistors) are activated, PWM continuously limits the power to the resistor. This can ensure that the resistor is always operating at its peak abilities and is not unintentionally overpowered. The MCU can ensure that the resistors are operating as intended by checking various individual fail-safes. If any unexpected incidents occur, the MCU can take pre-specified actions to alleviate the issues.

When the light is powered, the first operation is to determine the ambient temperature. This is done by the MCU checking the temperature sensors placed around the board. If the sensors' temperatures are all within a predetermined delta, the heater will operate as planned. If the ambient temperature is determined to be above about 10 degrees Celsius (or another specified temperature limit) the heaters will not activate. This is done because it is very unlikely that if the ambient temperature is above 10 degrees Celsius, snow, ice, and/or frost will form on the lens. If the ambient temperature is this high, the environmental conditions will make it impossible for the accumulation of snow, ice, and/or frost to occur. Excess heat also shortens the lifespan of LEDs. For this reason, it is preferable for the light temperature to be kept as low as possible to reduce LED lifespan degradation.

When the MCU determines that the heaters should be activated, the MCU will utilize PWM to send a steady amount of power into the resistors. The temperature inside the housing will rise rapidly to a temperature of about 70 degrees Celsius. A fail-safe is preferably in place that can prevent the temperature from increasing above about 100 degrees Celsius (or another specified temperature limit). The temperature inside the light can stabilize at a high temperature for a length of time predetermined by the software in the MCU (algorithm detailed below). After this calculated period, the MCU will begin to decrease the power sent to the resistors. A steady temperature will be reached and the MCU will vary the power sent to the resistors in order to maintain this temperature. This mode is termed the 'Standby' mode and will be activated indefinitely through the remainder of normal operation or until the light has been powered off and then powered back on. Because this preset temperature is set above the freezing level of water, no snow, ice, and/or frost will accumulate onto the lens for the remainder of operation.

The MCU will turn the heater on if the ambient temperature is below a threshold. Thus, the ambient temperature should be known every time the light turns on. Since all the sensors and heaters are inside the lamp, the sensors' measurement at initial power startup may be false (e.g., not representative of the ambient temperature) if the heater was recently ON; it will read a hot temperature as the heater was producing heat recently (this will happen during a blinking turn, a momentary stop, or any momentary ON/OFF/ON of the light). Hence, the sensors' measurement at startup cannot be relied on as being the ambient temperature. The MCU within the light preferably has a self-calibration function implemented within the software. A method of detecting these false readings by measuring maximum delta values of the sensors (maximum value minus minimum value) may be implemented in the code. The MCU can calculate the delta value of the different temperature sensor readings upon initial startup. This delta value is compared to an 'allowed maximum value' to be considered as ambient or not. The 'allowed maximum value' may be subject to change throughout the taillight's lifespan.

Upon each light startup, the MCU will take the average temperature reading from all (six) temperature sensors within. The MCU will then determine the maximum delta value (maximum reading minus minimum reading) between these sensors. If this delta is above the specified allowable delta, the light will determine that it is not in an ambient condition (false reading or heater was ON) and the MCU will rely on the last known ambient data (stored in a non-volatile memory, such as EEPROM) and act accordingly (mostly will turn the heater ON as it was previously ON). This delta may change over time if conditions permit. For example, upon initial startup the ambient temperature readings may be consistently above a predetermined delta of '2' across 10 individual initial startups of ON time lasting more than five minutes. After the tenth startup, the MCU may determine that a higher delta value should be applied. The 'allowed delta' may then be increased, for example, to a value of '3'. For all future initial startups, the temperature sensors will record values, and a delta will be acquired and then referenced against this new value of '3'. If the value is '3' or higher the heaters will rely on previously-stored data, while if the value is below this delta value of '3' the light will determine that it is in an ambient condition; it will then store that data in the EEPROM and act according to that ambient temperature.

The MCU can also calculate ambient temperature in another way. The MCU can time how long the heaters will be active at their peak power. For example, it can measure how long the heater will take to get from 35 degrees Celsius to 50 degrees Celsius. The resulting time value can then be used to approximate the ambient temperature. The heater ramp up time from 35 degrees Celsius to 50 degrees Celsius will be longer, for example, at zero degrees Celsius than at 15 degrees Celsius. Thus, if the MCU detects a shorter than expected ramp up time, the MCU may enter a different mode that will force the heater to turn OFF after a predetermined amount of time to confirm ambient temperature.

The light operation according to various embodiments of the present invention may be summarized as follows. When the light is activated, the MCU is powered. The MCU enters its initialization phase and begins to read the code. The MCU will determine the proper settings to choose based on three variables. These variables are the incoming (vehicle) voltage, the detected ambient temperature, and the internal temperature of the light housing. If the MCU determines that the heaters must be activated, PWM will be used to limit the voltage moving into the resistors to the desired level. The resistors will then heat to their peak output for a certain amount of time. This amount of time is determined by a calculation performed by the MCU based on the ambient temperature at startup. After the light has completed its ramp up period (i.e., the period of time taken to heat the lens from ambient to peak temperature), the light will operate at its peak temperature for the period of time previously calculated. Once this time has elapsed, the PWM will lower the amount of power being sent into the resistors. The resistors will then enter a lower power mode and will no longer transmit at peak power. This low power (standby) mode will ensure that the exterior surface of the light remains at a temperature above that of the freezing point of water. The amount of power sent to the resistors will vary with the ambient temperature reading in order to maintain this above-freezing lens temperature. The light will then operate in this standby mode indefinitely, or for the remainder of operation. It is not until the light is turned off and then back on that the standby mode is deactivated and normal operation of the heater resumes.

Hardware

Embodiments of the present invention provide LED lamps with a lens heating mechanism, as shown, for example, in FIGS. 1-14. The lamps in these examples use a polycarbonate lens and a polycarbonate housing; however, in other embodiments, different materials may be used for one or both of these components. Also, the lamps in these examples use a lens having a textured interior surface with optical features thereon (e.g., above each LED), and a smooth exterior surface; however, in other embodiments, different lens configurations (colors, textures, patterns, projections, etc. on inner and/or outer lens surfaces) may be used.

Figure 2:
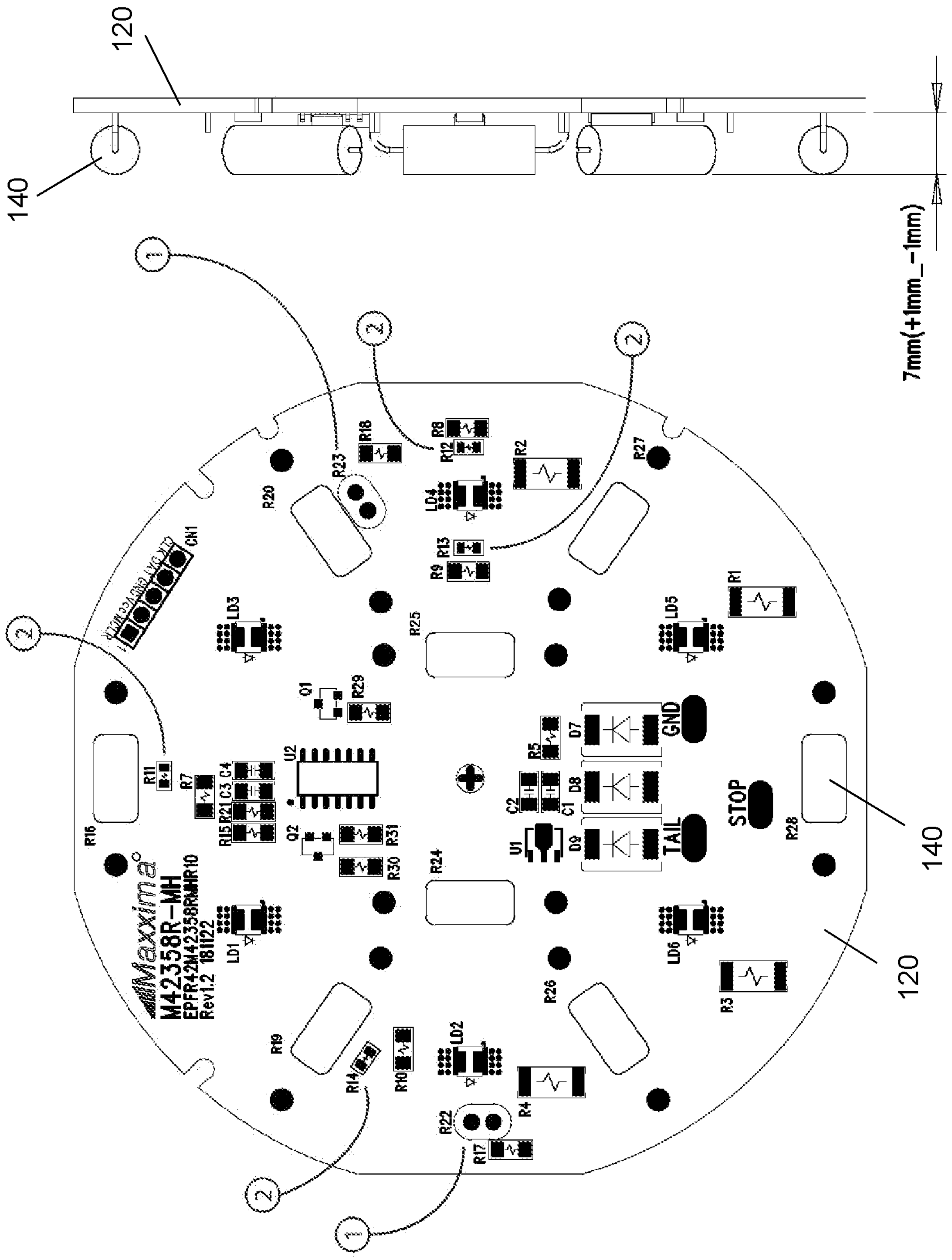
FIG. 2 shows front and side views of the circuit board of the lamp of FIG. 1.
Figure 3:
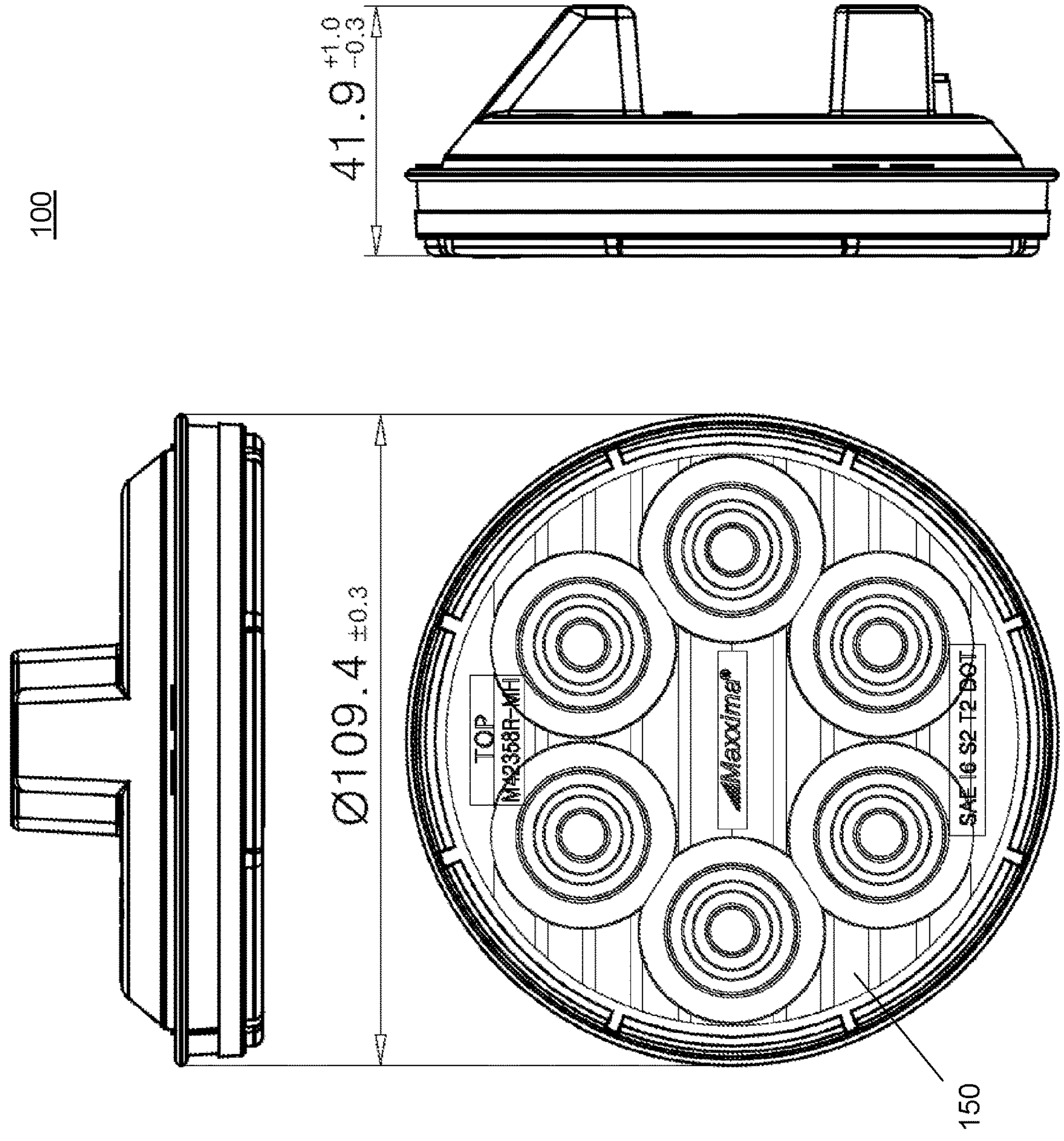
FIG. 3 shows top, front, and side views of the lamp of FIG. 1, with dimensions marked in mm.
Figure 4:
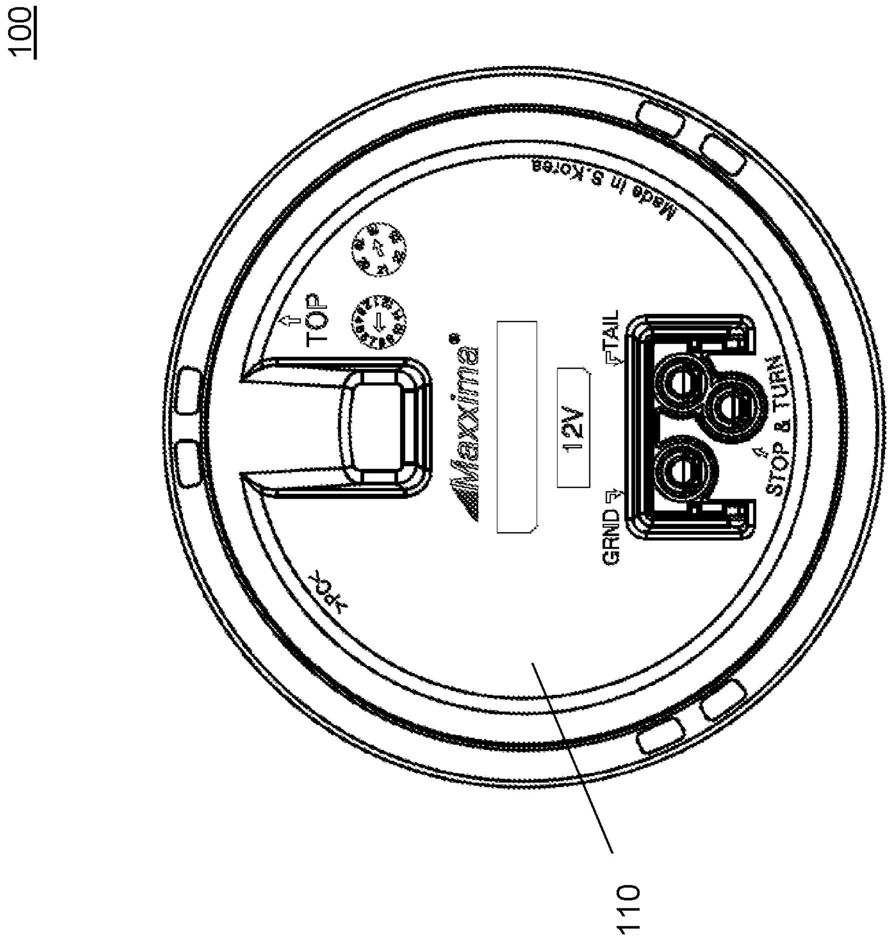
FIG. 4 shows a back view of the lamp of FIG. 1.
Figure 9:
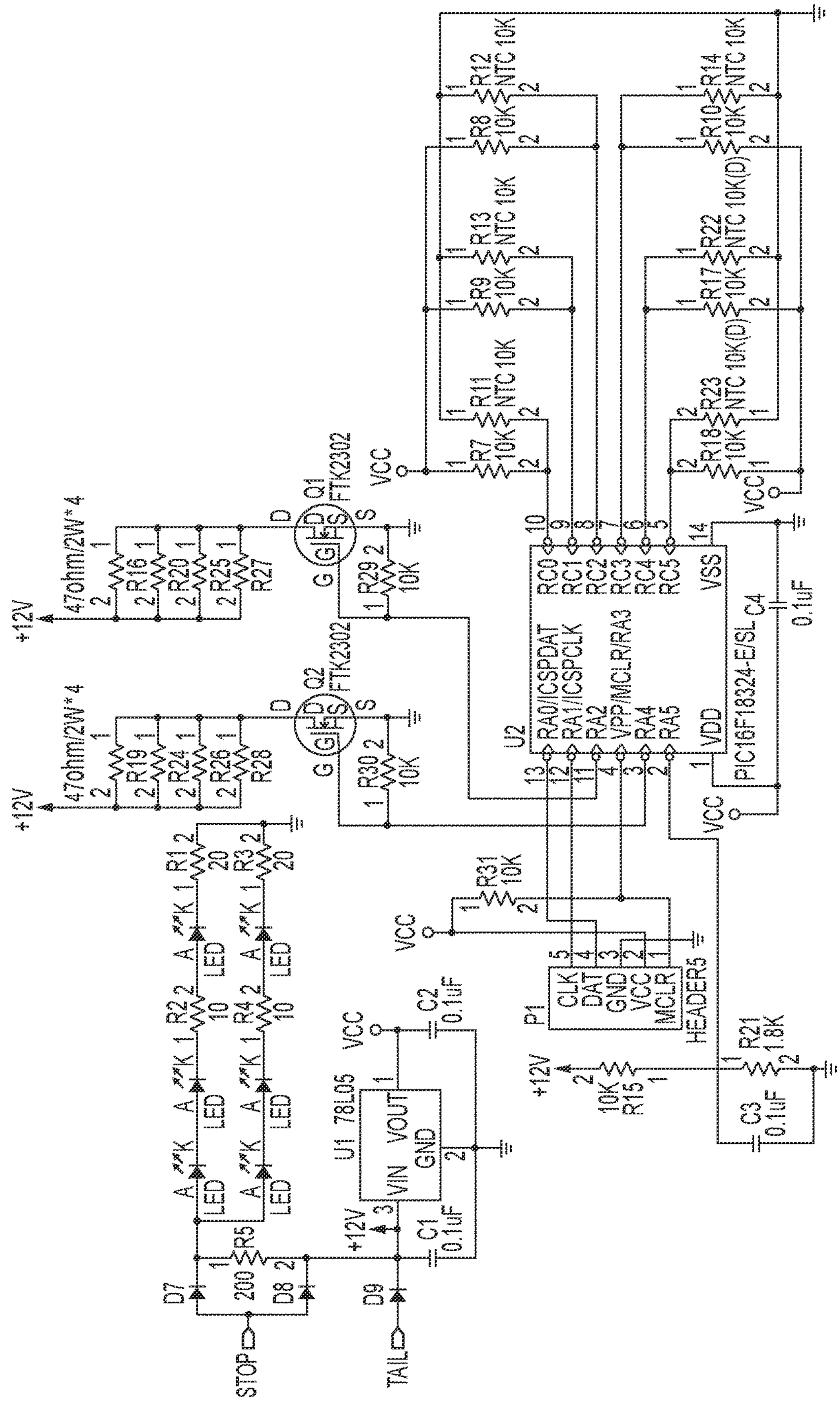
FIG. 9 shows an electrical schematic of the lamp of FIG. 1.

FIGS. 1-4 show an illustrative 4-inch round STT lamp with heated lens technology, according to various embodiments of the invention. FIG. 1 is an exploded view of lamp 100, which includes a housing 110, a circuit board 120, six LEDs 130, eight resistors 140, and a lens 150. FIG. 2 provides front and side views of the circuit board 120, which includes two ambient temperature sensors 1 (extended/off-board sensors; elevated above the PCB) and four surface temperature sensors 2 (surface-mount sensors; placed onto the PCB). FIG. 3 shows top, front, and side views of lamp 100, with dimensions marked in mm, and FIG. 4 shows a back view of lamp 100. FIG. 9 shows a schematic of the wiring on the PCB 120 and within the light housing 110 for lamp 100. Lamp 100 and lamp 200 share the same schematic. FIGS. 10A-10F show the heat spread over time on lamp 100. FIGS. 10A-10F respectively show lamp 100: at initial startup; after 10 seconds of power on; after 30 seconds of power on; after 1 minute of power on; after 2 minutes of power on; and after 3 minutes of power on.

Figure 5:
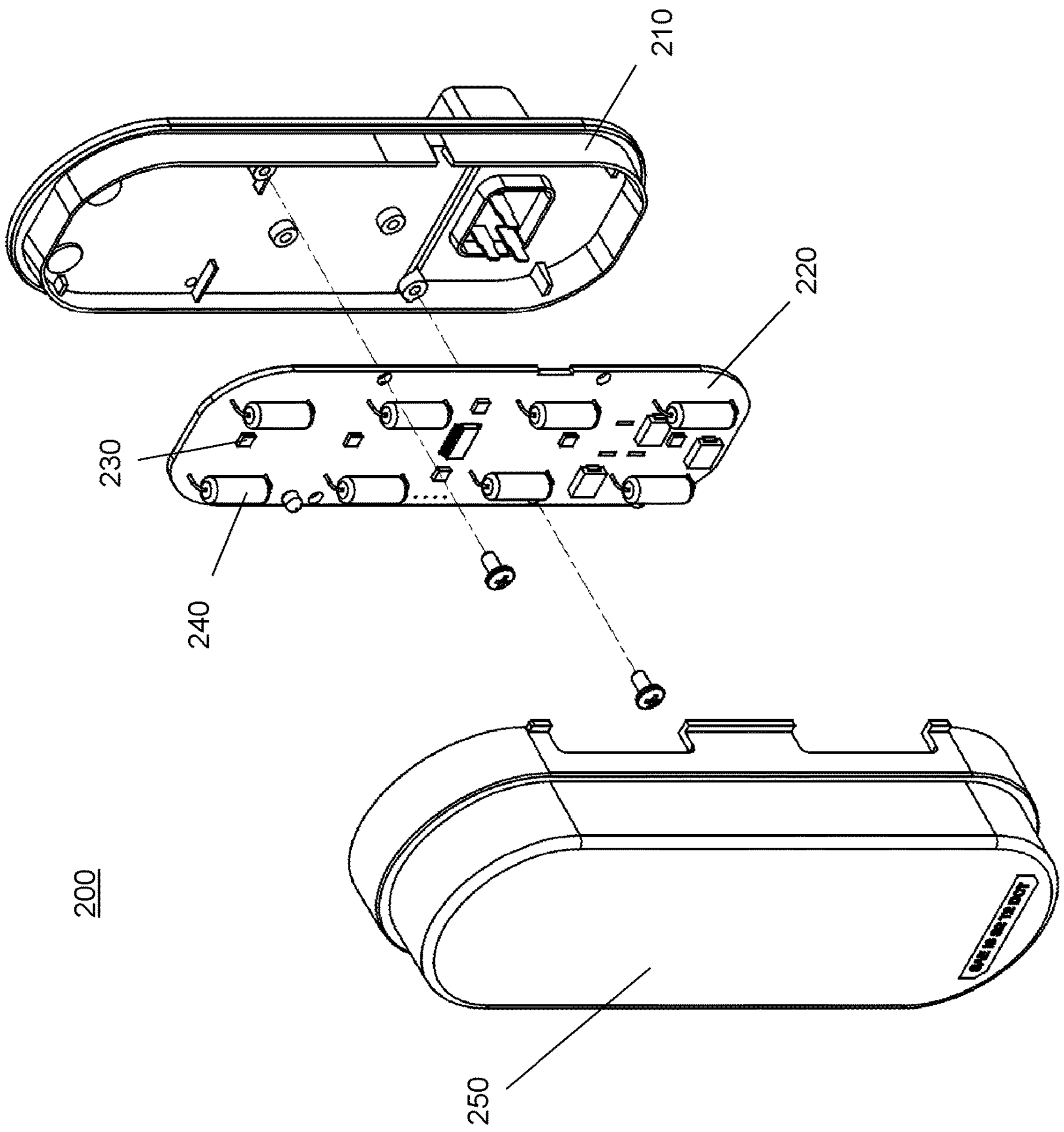
FIG. 5 shows an exploded view of an illustrative 6-inch oval STT lamp with heated lens technology, according to various embodiments of the invention.
Figure 6:
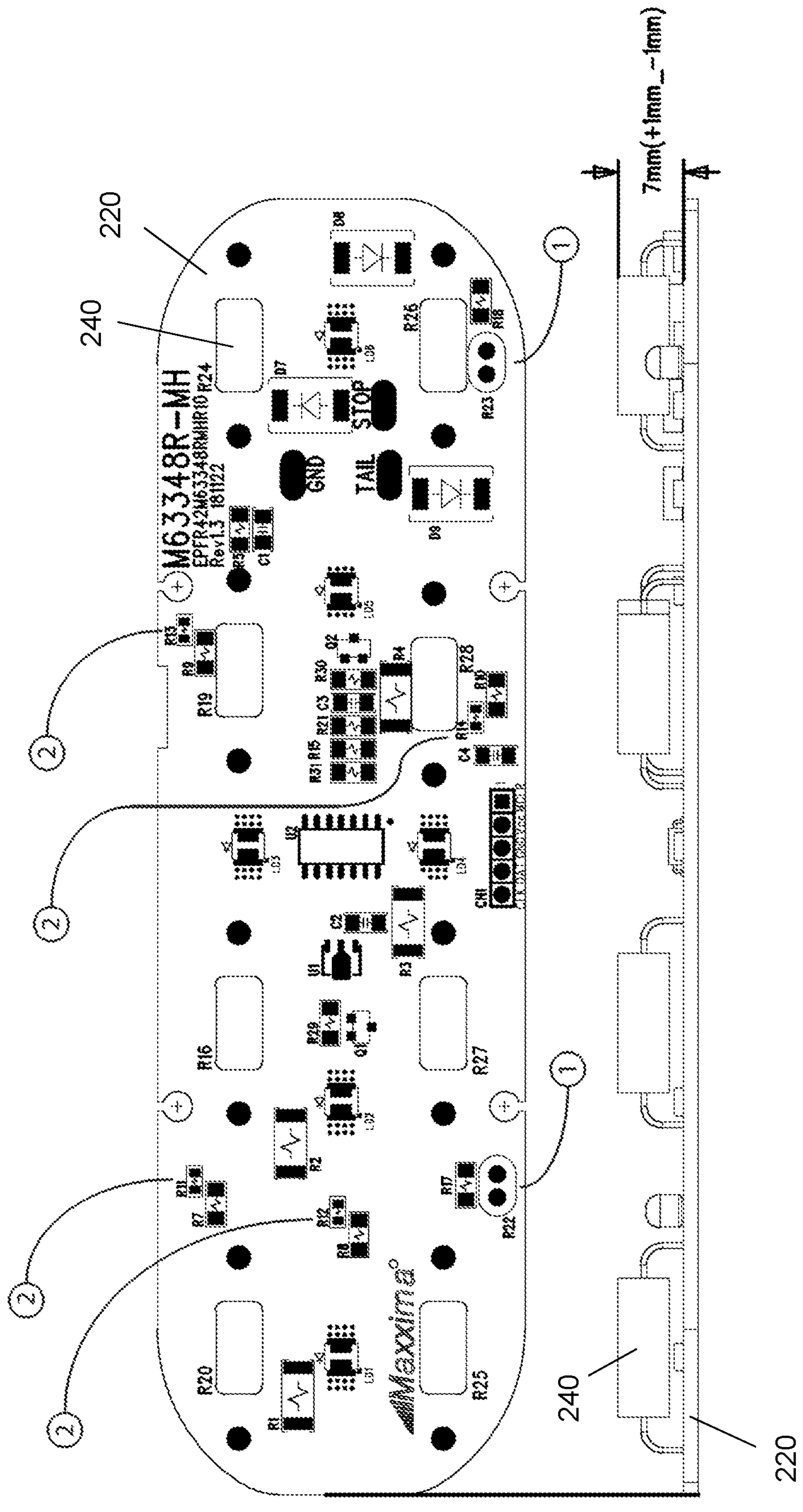
FIG. 6 shows front and side views of the circuit board of the lamp of FIG. 5.
Figure 7:
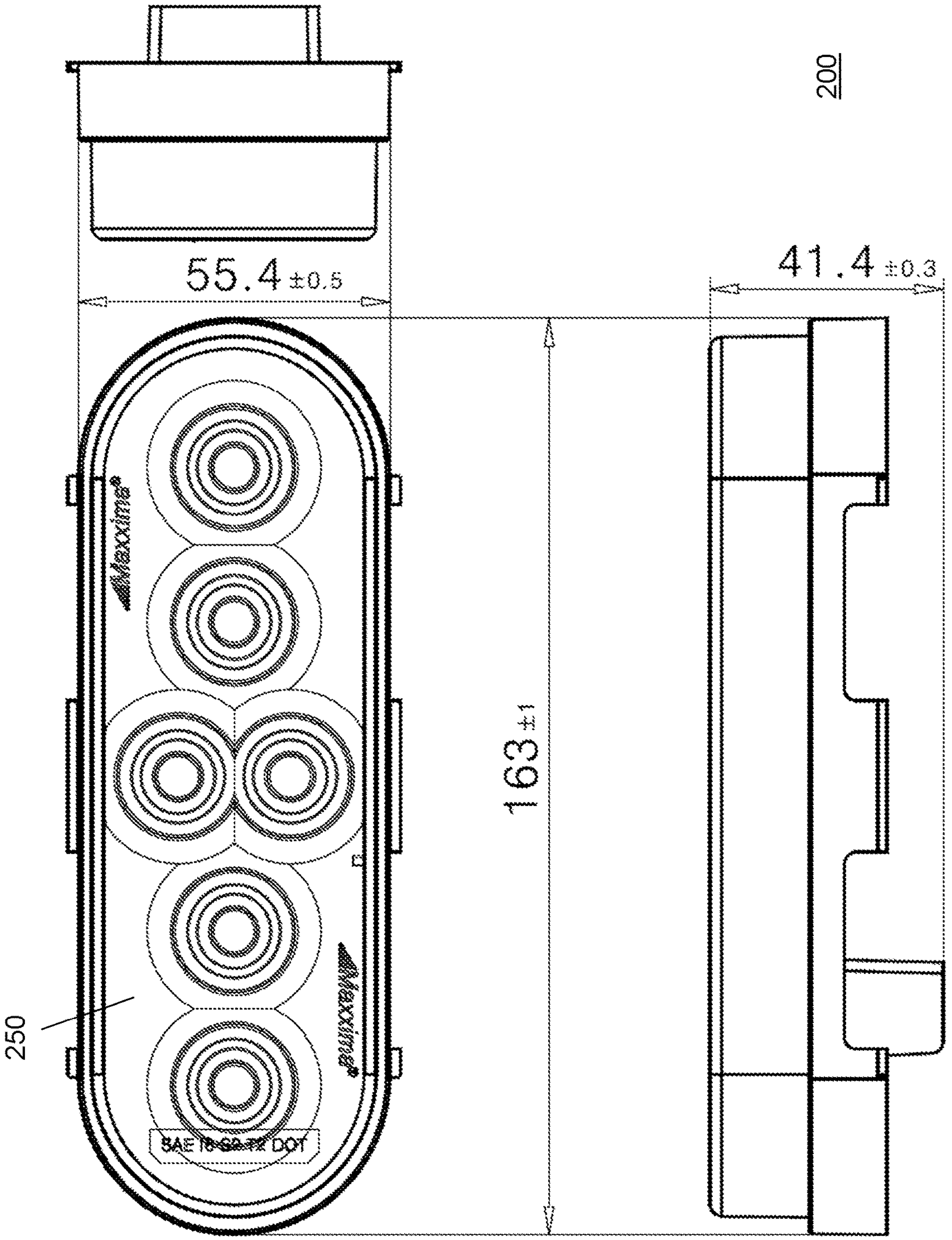
FIG. 7 shows front, end, and side views of the lamp of FIG. 5, with dimensions marked in mm.
Figure 8:
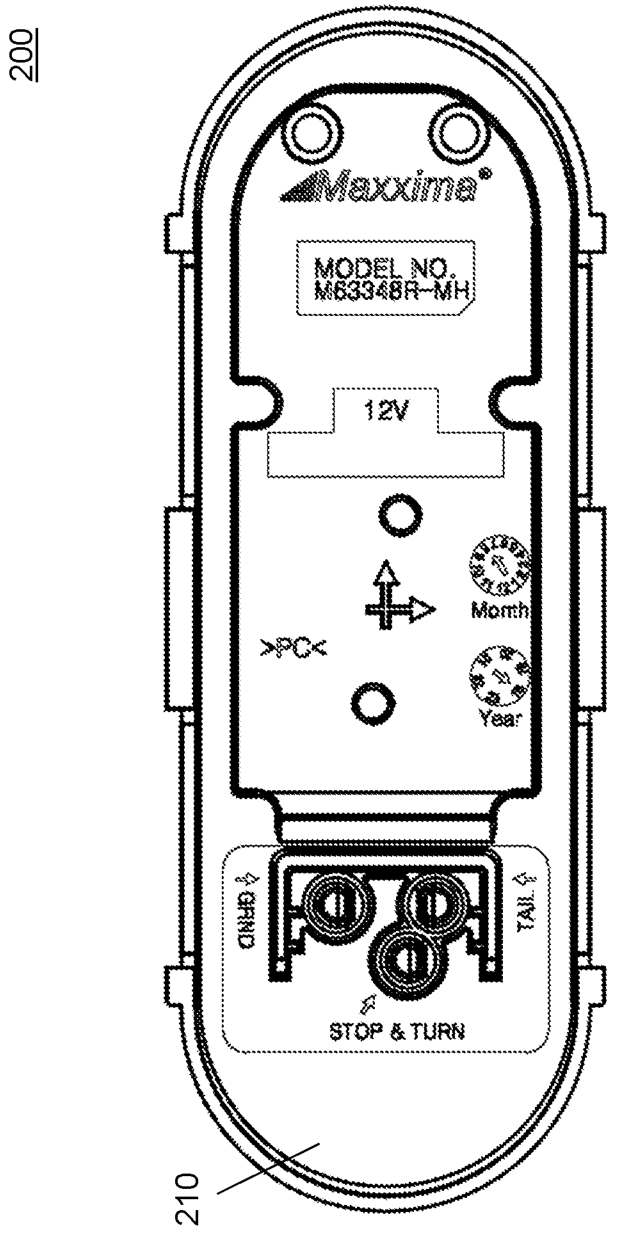
FIG. 8 shows a back view of the lamp of FIG. 8.

FIGS. 5-8 show an illustrative 6-inch oval STT lamp with heated lens technology, according to various embodiments of the invention. FIG. 5 is an exploded view of lamp 200, which includes a housing 210, a circuit board 220, six LEDs 230, eight resistors 240, and a lens 250. FIG. 6 provides front and side views of the circuit board 220, which includes two ambient temperature sensors 1 (elevated above the PCB) and four surface temperature sensors 2 (placed onto the PCB). FIG. 7 shows front, end, and side views of lamp 200, with dimensions marked in mm, and FIG. 8 shows a back view of lamp 200. FIGS. 11A-11F show the heat spread over time on lamp 200. FIGS. 11A-11F respectively show lamp 200: at initial startup; after 10 seconds of power on; after 30 seconds of power on; after 1 minute of power on; after 2 minutes of power on; and after 3 minutes of power on.

The resistors are strategically placed onto the PCB to allow for the maximum heat spread. The illustrative resistor layout for lamp 100 places one resistor 140 on the uppermost part of the PCB 120 and one resistor 140 on the bottom half of the PCB. The remaining six resistors 140 are placed in a triangular layout adorning the sides of the PCB 120. The illustrative resistor layout for lamp 200 includes eight resistors 240 aligned alongside the two long edges of the PCB 210. Due to the thin nature of the light 200, the two lines of resistors 240 will allow for optimum heat distribution. Two rows for four resistors 240 lay in parallel on either side of the board 210.

Figure 10A:
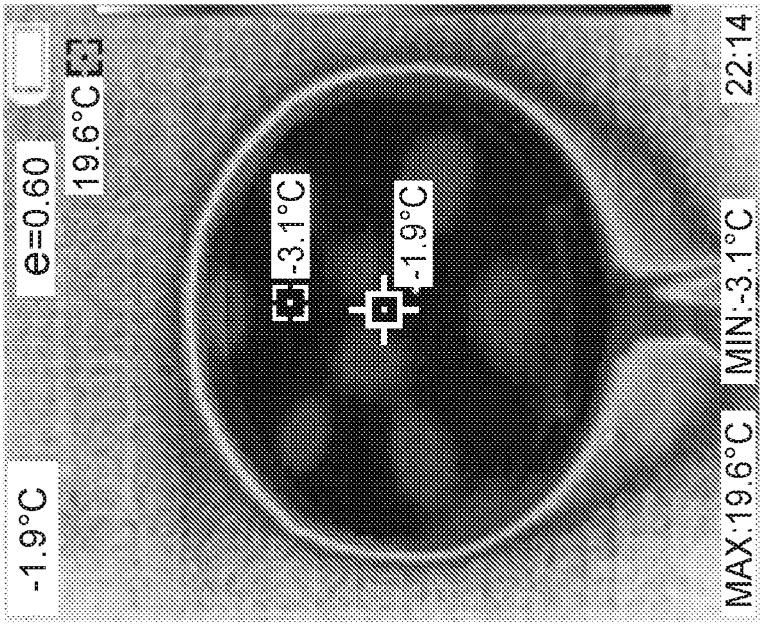
FIGS. 10A-10F show heat spread over time on the lamp of FIG. 1.
Figure 10B:
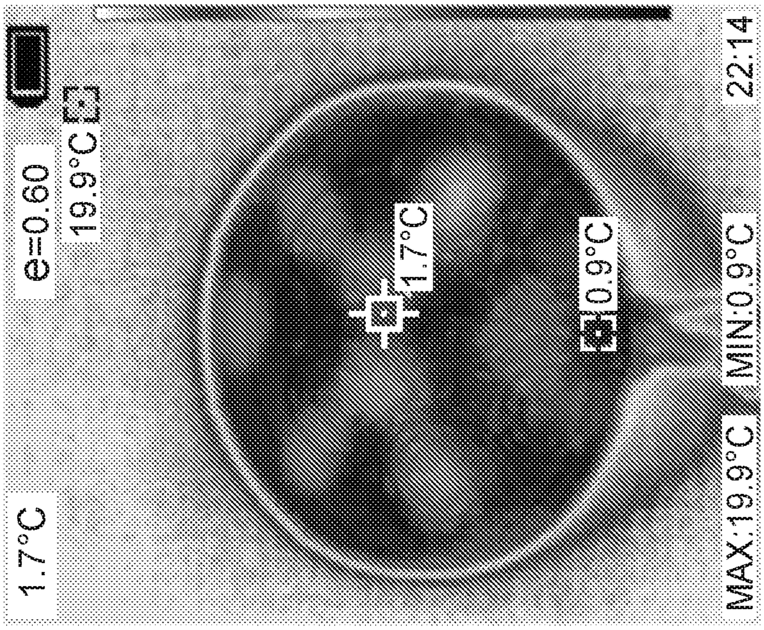
Figure 10C:
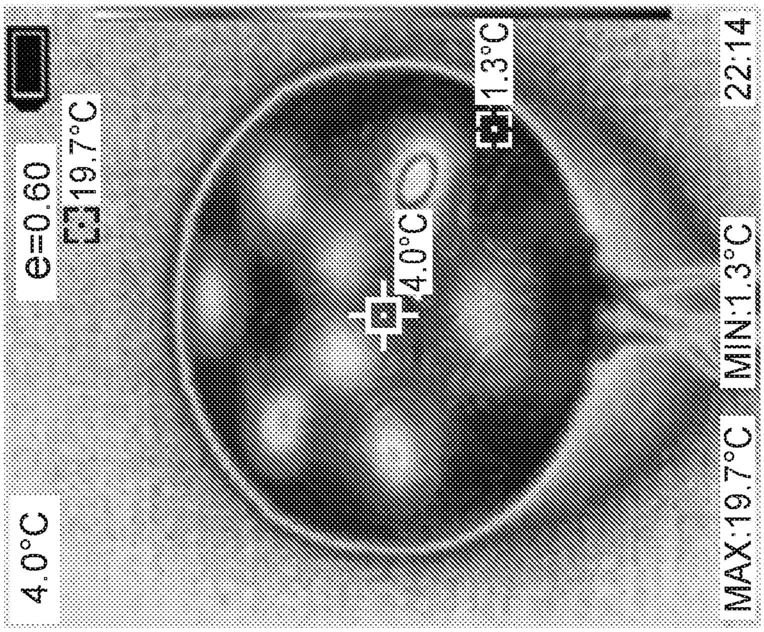
Figure 10D:
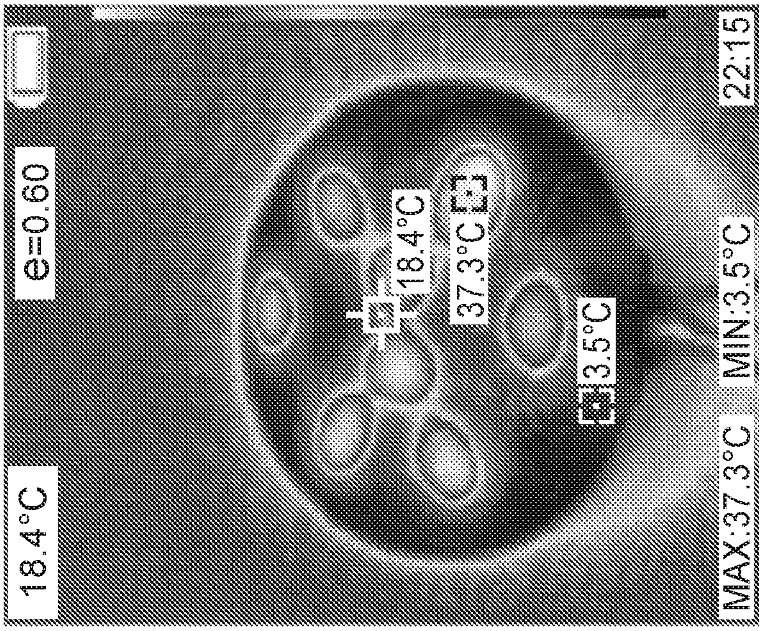
Figure 10E:
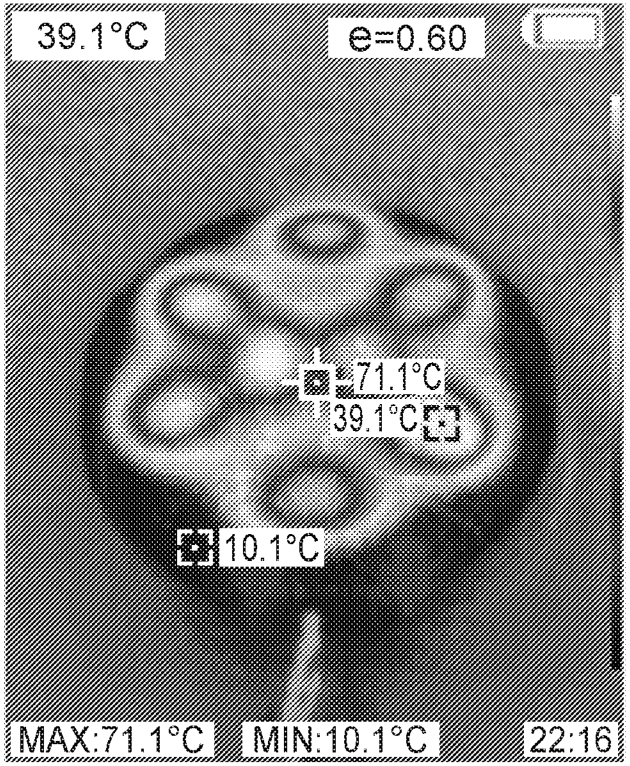
Figure 10F:
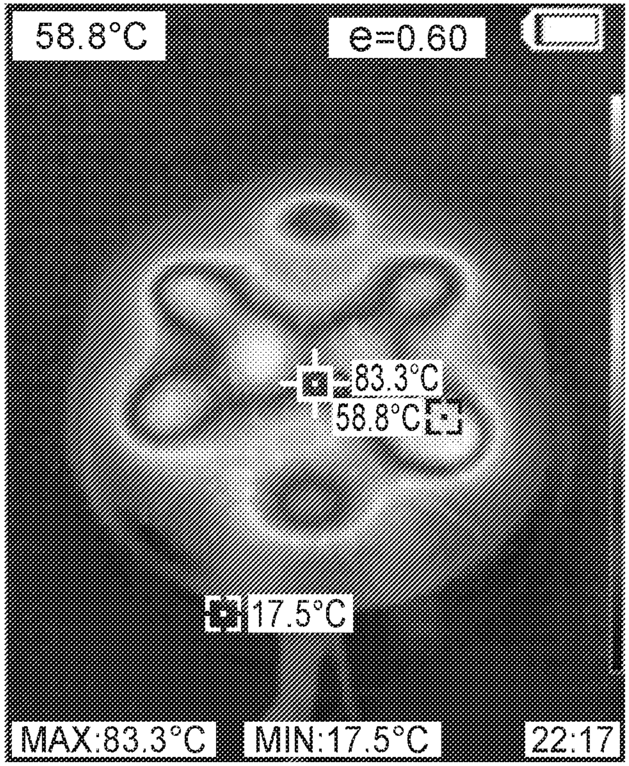
Figure 11B:
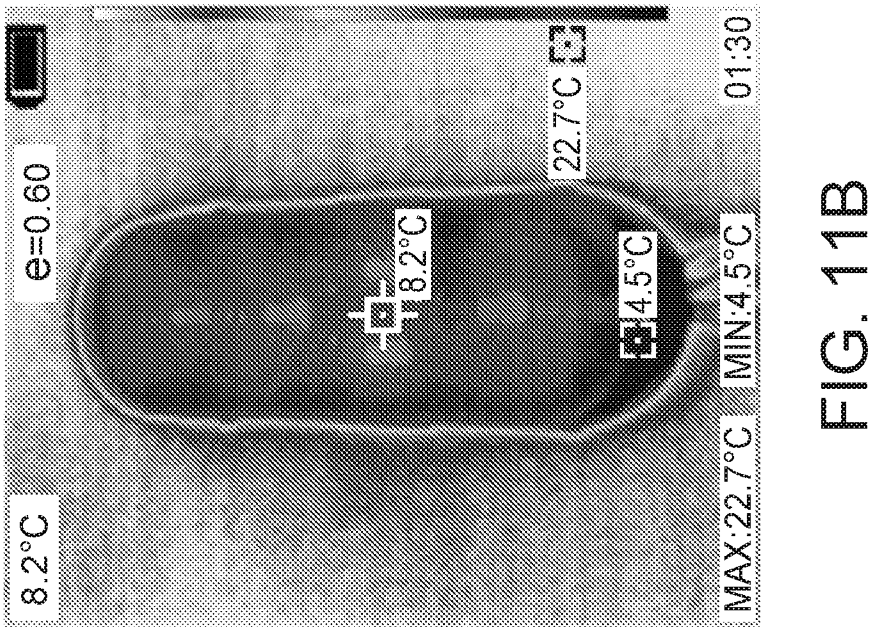
FIGS. 11A-11F show heat spread over time on the lamp of FIG. 5.
Figure 11A:
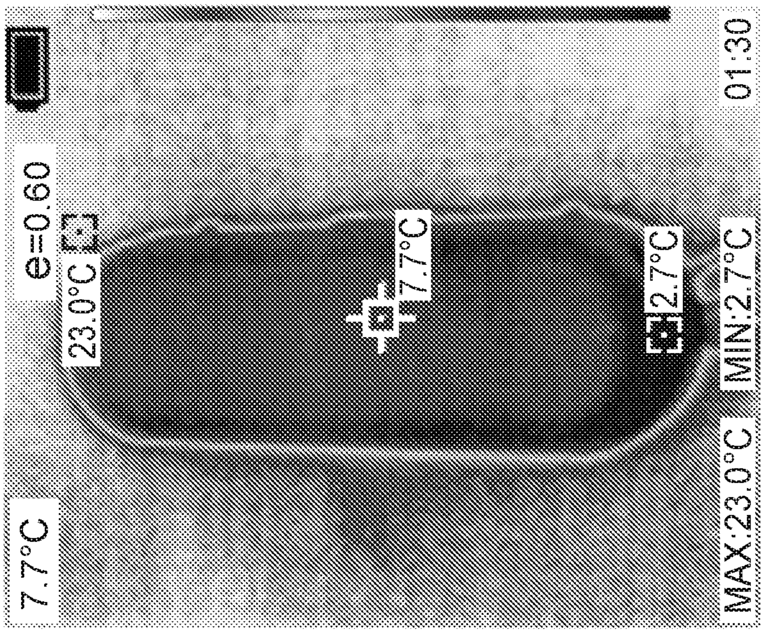
Figure 11C:
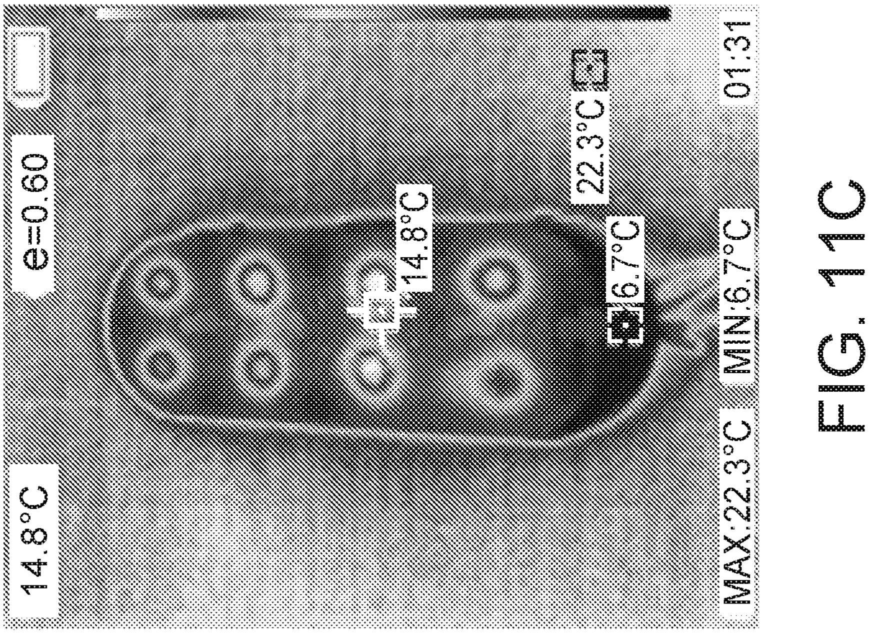
Figure 11D:
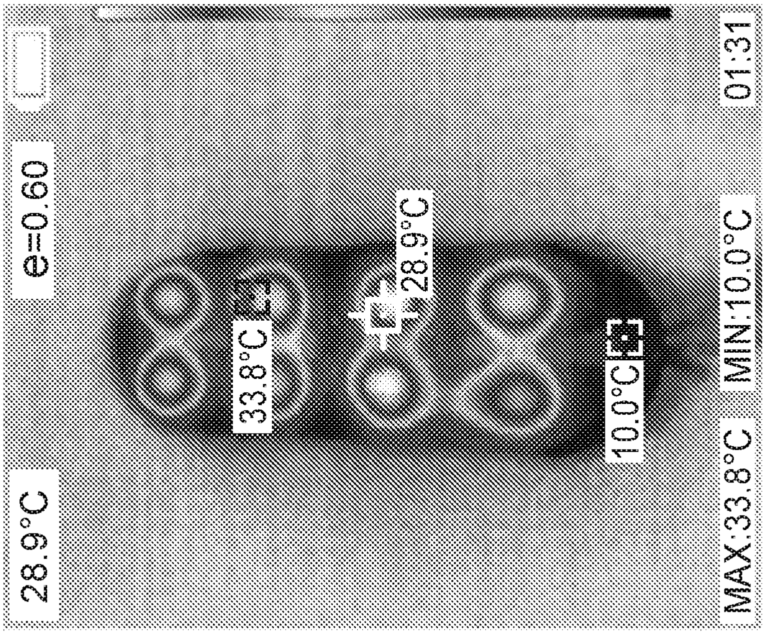
Figure 11E:
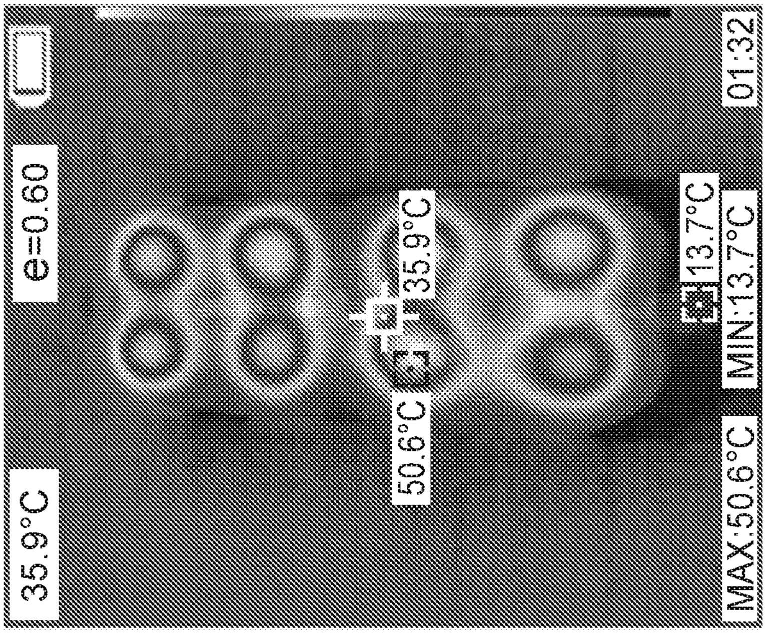
Figure 11F:
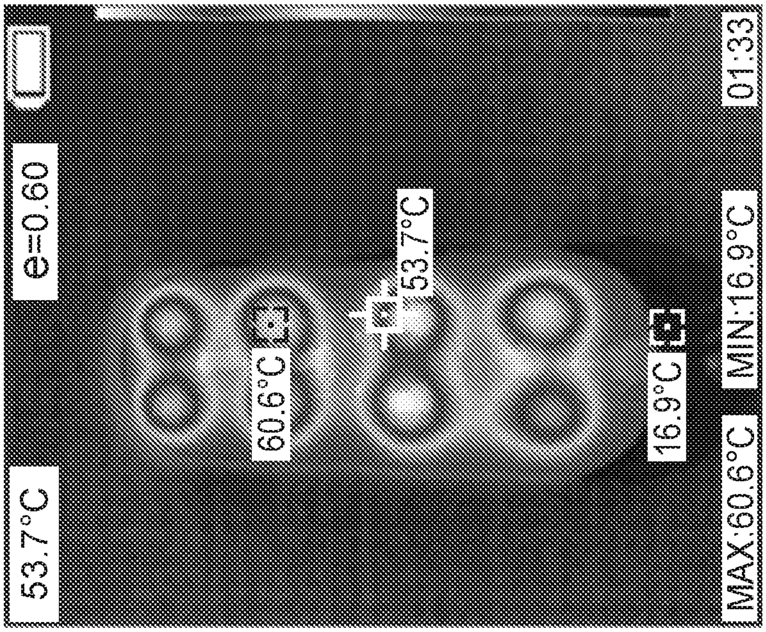

The arrangement of the resistors 140, 240 within these two lights 100, 200 allows for relatively even heat distribution. The temperature peaks are centered directly above the resistors 140, 240 and the heat then spreads throughout the surface of the lens 150, 250. Due to the strategic placement of the resistors 140, 240, there are no ‘cold spots’ on the lens 150, 250. That is, there are no areas on the lens 150, 250 where the temperature does not sufficiently warm in order to melt the snow, ice, and/or frost build up on the exterior surface of the lens. For example, as shown in FIGS. 10A-10F, the heaters 140 activate within seconds after the power is applied. As shown in FIG. 10A, the light 100 was started at a temperature of −1.9 degrees Celsius. At this temperature, the sensors 1, 2 within the housing 110 detected low ambient temperature and the heaters 140 were activated. As shown in FIG. 10F, after only three minutes, the peak surface temperature on the lens 150 was 83.3 degrees Celsius. At this point, the entire exterior surface of lamp 100 was well above the freezing temperature of water. Thus, any snow, ice, and/or frost on the lens 150 would begin to melt within seconds following the activation of the heaters 140 within the light housing 110.

Figure 12:
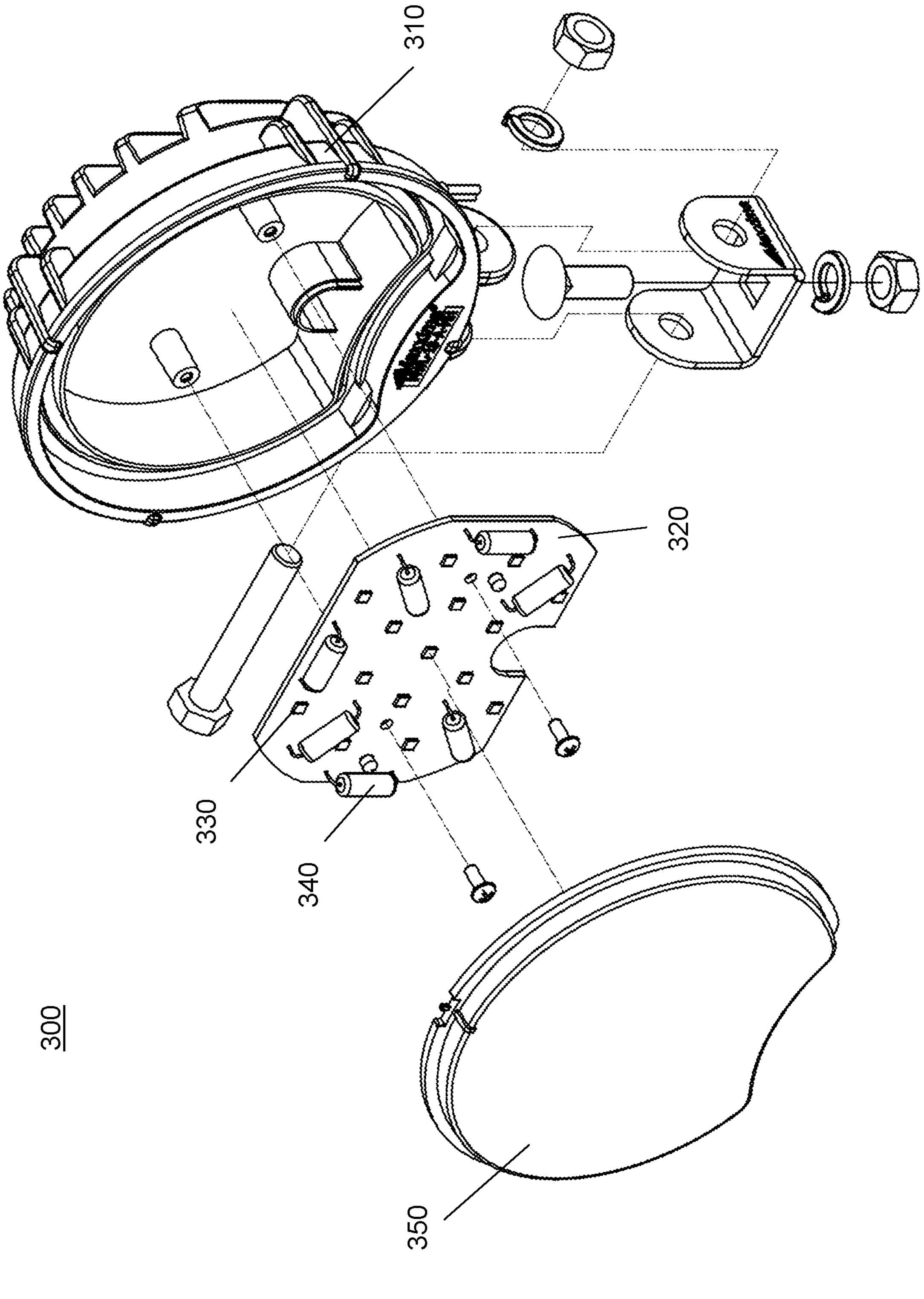
FIG. 12 shows an exploded view of an illustrative work light with heated lens technology, according to various embodiments of the invention.
Figure 13:
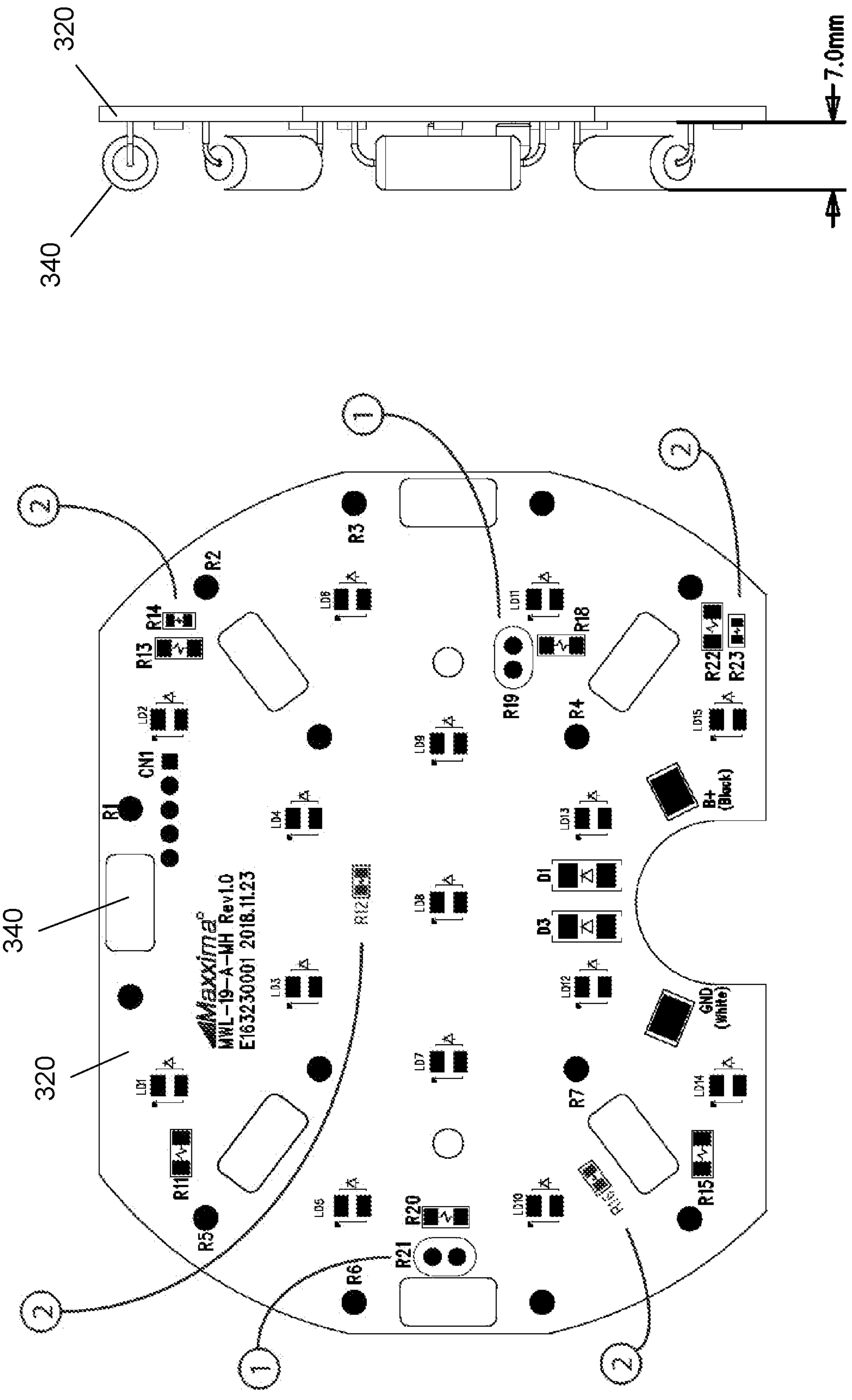
FIG. 13 shows front and side views of the circuit board of the work light of FIG. 12.

FIGS. 12 and 13 show an illustrative work light with heated lens technology, according to various embodiments of the invention. FIG. 12 is an exploded view of lamp 300, which includes a housing 310, a circuit board 320, 15 LEDs 330, seven resistors 340, and a lens 350. FIG. 13 provides front and side views of the circuit board 320, which includes two ambient temperature sensors 1 (elevated above the PCB) and four surface temperature sensors 2 (placed onto the PCB).

Figure 14:
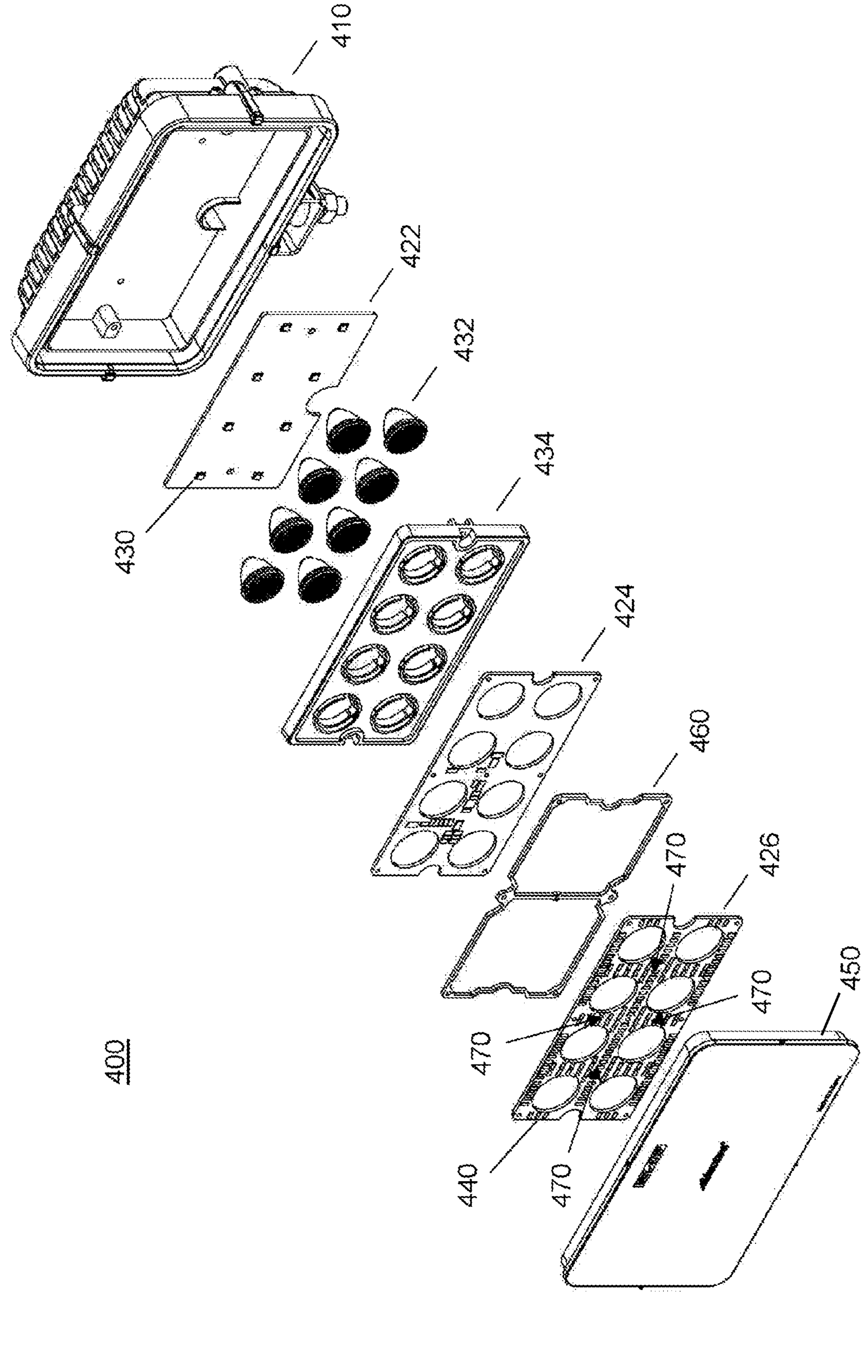
FIG. 14 shows an exploded view of an illustrative work light with heated lens technology, according to various embodiments of the invention.

FIG. 14 shows an illustrative 8-LED rectangular multi-voltage work light with heated lens technology, according to various embodiments of the invention. FIG. 14 is an exploded view of lamp 400 (dimensions approximately 6"×4"×2"), which comprises three printed circuit boards (PCBs). The outermost PCB (near the lens) in this example has 172 thick film SMD (surface mounted device) resistors and four SMD temperature sensors; however, different numbers and/or types of resistors and/or temperature sensors may be used in other embodiments. As shown in FIG. 14, lamp 400 includes a housing 410 and a lens 450, enclosing a PCB 422 with 8 LEDs 430, an inner lens optic 432, a lens optic holder 434, a power PCB 424 (PCB with MCU and power management components), one or more spacers 460 (used to isolate and place the PCB with resistors closer to the lens), and a PCB 426 with resistors 440 (used as the heating element) and temperature sensors 470 (which may be similar in appearance to resistors 440; the approximate position of each of the four temperature sensors 470 is indicated by an arrow).

FIGS. 1-14 illustrate certain examples; however, the invention is not limited to the exact structure and configuration depicted therein. For example, in other embodiments, different numbers and/or arrangements of resistors and/or temperature sensors (surface temperature sensors and elevated temperature sensors) may be used. In addition, in other embodiments, different types of LED lamps (other than taillights and work lights) may be adapted to include a lens heating mechanism as described herein.

Software

Embodiments of the present invention also provide software (code developed for the MCU), for example, as detailed below. In the illustrative embodiment described below, the processes are described in the order they are written in the code. However, those of ordinary skill in the art will understand that these functions may be performed in a different order, and/or certain details may be varied, while still falling within the scope of the invention.

To begin the code, certain predetermined values have been identified and defined. The code has been written to use only positive integers, so many values have been recalibrated onto a new scale. For example, the temperature readings from the (six) temperature sensors have been set to a new scale. When a temperature sensor detects a temperature of −20 degrees Celsius, the code will convert this value to '233'. When the sensor records 125 degrees Celsius, a value of '9' will be measured.

When the vehicle light is first started, the MCU begins its initialization phase. No power will be sent to the heaters and no settings or mode will be selected at this stage. The MCU will run through its initialization operations and then a small delay will follow. This delay can ensure that a stable flow of voltage is in place on all the components, thus preventing any possible source of error in the initial sensor measurements. The code may then run a debugging program (e.g., for analyzation purposes).

The code then obtains all the values from the EEPROM in order to select the necessary settings. The next section of code is dedicated to changing the allowable delta values between the temperature sensors housed within the light housing (casing) in order to set the activation delta. The standard activation delta is '2'. This means that if the temperature sensors within the light record values that are 2 or more values different from one another, the heaters will run according to the last known temperature that had a delta of less than '2'. For example, if the sensors placed on the board itself record an average temperature value of '90' and the ambient temperature sensors record a value of '92' or higher, the MCU will run according to its last known temperature. However, if this example value is recorded as '91', it will be within the delta set as '2' and the MCU will determine that the measured value is an ambient temperature, it will then store that value in the EEPROM and run the software according to that value. For example, the vehicle may have been parked for a long period of time. The average temperature readings across the entire light fixture will be equivalent or within 1 temperature value of one another assuming enough time has passed for the light housing to reach an equilibrium temperature. In this situation, the light will not rely on a previous reading. This setting can ensure that the heater will never turn on or off at start up by default. Instead, the heaters will wait until the MCU determines other parameters in order to select the proper heater settings. This feature can also allow the heater to turn on when the turn signal is activated and the ambient environment is cold. When the turn signal is active, the light powers on and then off repeatedly. This requires the light to restart every time. This would result in the heaters gaining power just as the turn signal turns back off, ensuring that the light would never reach its peak temperature. To circumnavigate this issue, this code has been created. When the light is heating, the temperature sensors within the light will read very different values, ensuring that the delta between the sensors is larger than '2'. The different values will occur due to the uneven nature of the interior heating. In this case, the moment the light regains power from the turn signal activating, the heater will begin to discharge energy into its surroundings. This ensures that even if the turn signal is activated, the light heaters will be activated and will produce sufficient heat to melt the cold weather-related obstructions away and off of the lens.

A self-calibrating function may be provided in the code as well. For example, in some embodiments, when the system records a startup delta of '2' or more and the light ran for five minutes or more, an internal counter on a non-volatile memory (e.g., EEPROM) will increase its value. A delta of less than '2' will reset the counter back to 0. After 10 successive startups lasting more than five minutes, with the delta greater than the allowed delta (in this example '2'), the counter will reach its predetermined maximum value of '10' and a new function will be started. This function will add one data value to the allowable delta. After this function has been completed, the standard activation delta in this example will be changed from '2' to '3'. In all future situations, the light will activate and the temperature sensors will calculate the delta value. If said delta value is now '3' or above, the internal counter will begin the process again. However, if the sensors record a delta of '2' or below, the MCU will assume that the light is in ambient conditions and the light heaters will remain off by default.

A section of code can be provided to ensure that only meaningful temperature changes will be recorded to the EEPROM. For example, in some embodiments, for the MCU to save new values, the last recorded temperature must fall within a range of +/−2 temperature values from the last known ambient temperature. This can ensure that the EEPROM data is only changed when significant temperature changes have occurred between light startups. Without this feature in place, the EEPROM data would be replaced with every light activation (i.e., with every turn signal startup). Continuous data replacement would reduce the operating lifespan of the EEPROM significantly, thus this function allows for both more efficient data collection and reduced lifespan degradation of the EEPROM within the light housing.

A section of code may also be provided to ensure that the heaters will not be activated in unnecessary situations. For example, in some embodiments, if the ambient temperature is determined to be above the predetermined program start up temperature (e.g., more than 10 degrees Celsius), then the program will enter 'Standby' mode, thus shutting the heaters off, and will continually monitor all the sensors until one of them measures a temperature below 10 degrees Celsius. This code can ensure that if the light is activated and the temperatures are all above the predetermined program start up temperature, then the heaters will not activate. This can prevent unnecessary heating of the lens in environmental conditions that do not require it. LEDs' lifespans decrease with excess temperature, so this function can not only prevent unnecessary power draw, but can also reduce the LED lifespan degradation.

In a similar fashion, when the program is powered, if the MCU determines that the lowest ambient temperature is lower than that of the predetermined program start temperature, the program will be set to its 'Active' mode.

A test mode counter can be the next function, and may be provided as follows. In various embodiments, every light is equipped with a test mode function. This function can ensure that the light heaters will activate, for example, for the first 7 start ups regardless of the external conditions. This mode allows distributors and customers of the product to inspect the product before installation. For example, in some embodiments, when the light is activated, the MCU will check if the 'test mode count' value saved in the EEPROM is less than that of the 'max test counter', a value that has been predetermined to be '7'. If this is the case, the program mode will be set to 'Active'. Once the program is activated, an internal clock will begin to count to the predetermined value, for example, of 120 seconds (two minutes). Once this count is completed, the test mode has been verified as 1 complete cycle and the counter function can be operated. The counter function will then add 1 value to the 'test_mode_count' and this new value will be saved into the EEPROM. Once the 'test_mode_counter' value is equal to the 'max_test_counter', the program will be completed and the test mode will never activate again.

The code can then determine the maximum PWM values. A calculation is completed by the MCU utilizing numerous predetermined values and referencing the current PCB temperature. The code will determine whether the current PCB temperature is higher than the allowed, predetermined, maximum temperature when the heaters are active.

If the program determines that the maximum temperature is less than the predetermined maximum temperature, then the MCU will reference the predetermined overdrive values saved in the EEPROM and the MCU will compare these values with the 'max_amb' temperatures within the housing. When the MCU determines that the temperatures are lower within the light than they theoretically could be, the overdrive function will be activated. The overdrive function of the resistors is defined in detail in the hardware description below.

The MCU can then calculate the maximum value of the PWM in both normal and overdrive situations. It does so by first determining if the voltage is greater than the defined maximum. If this is the case, the PWM will be set to a new value calculated from the maximum wattage of the resistor divided by the voltage squared. This new calculated value is set as the PWM's new maximum value. If the voltage entering is lower than that of the predefined voltage, then the PWM will be set to the predetermined value of '1023'.

The code then calculates the maximum PCB temperature as well as the minimum PCB temperature.

The program may then enter a time dependent checker section. In this section, all actions are determined via an internal clock. In some embodiments, the first action that is determined via this function is determining how long the heater will remain at full power. The MCU will record the temperature of the light at startup and save it to the EEPROM. When the MCU reaches this section of the code, the MCU will reference this initial temperature and determine the length of time the heater will stay at maximum power via this reading. For example, if the initial temperature is recorded as only a few degrees below zero degrees Celsius, the heater will stay at its maximum power for a relatively short duration. This is because less energy will be required to melt any exterior surface obstructions. However, if the initial temperature is determined to be, for example, 20 degrees below freezing, significantly more energy will need to be transferred into the exterior obstruction in order to melt it. The algorithm to determine this length of time may work as follows. By default, the heaters will run at their maximum ability for a preset value of 500 seconds (8 minutes and 20 seconds). A function has been added to the code that will extend this preset value via numerous internal counters and sensor references. If the 'mark_for_off' reference is active, the algorithm will complete the following process. The algorithm will first reference the 'mark_for_off_wait' definition and then divide this value by the 'mark_for_off' value multiplied by 2. This calculated value will then be utilized to determine how long the heaters will be set to active. If the 'mark_for_off' reference is not activated, the following will take place. The 'over_df_limit' will be set to a new value by first referencing the 'over_df_count_start' and multiplying this value by 2. This calculated value is then added to the 'hard_wait_b4_ka' value that has been predetermined as 600 seconds (10 minutes). This value will then be set as the period of time for which the heaters will operate at their maximum ability.

After the heater has run at its maximum power for the calculated amount of time, the heater may enter a 'keep alive' mode. This mode will lower the heat discharged by the resistors to save power and prevent resistor degradation. At this point all possible snow, ice, and/or frost may be assumed to have been removed from the lens and the heater is kept in a low power mode to prevent future water contamination (snow, ice, or frost). The code will continuously monitor the (six) temperature sensors within the light housing and determine how much power to send to the resistors. At this stage in the light heating process, it is very likely that all cold weather-related surface obstructions have been melted away from the lens. Therefore, it may be unnecessary to keep the heaters on at full power. The heaters can vary their power output in order to keep the lens exterior surface at a temperature above that of the freezing point of water (zero degrees Celsius). As the external temperature lowers, the amount of heat produced by the resistors can rise to account for the new temperature delta. If the external temperature rises, the resistors can produce less heat in an attempt to save power. This process will preferably carry on until the light has been turned off and the ambient temperature reading average falls to within the delta value determined earlier in the programing.

While there have been shown and described fundamental novel features of the invention as applied to the preferred and illustrative embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. For example, various features and structures of the different embodiments discussed herein may be combined and interchanged. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. A heating system for an LED vehicle lamp having a housing and a lens, comprising:

a circuit board positioned within the housing;

at least one LED mounted to the circuit board;

a heating element mounted to the circuit board, wherein the heating element comprises at least two resistors configured to heat the lens from within the housing;

at least two temperature sensors mounted to the circuit board, wherein the at least two temperature sensors include at least one temperature sensor positioned proximal to the heating element and at least one temperature sensor positioned distal to the heating element; and a microcontroller in communication with the resistors and the temperature sensors, and having stored thereon computer-executable instructions which, when executed, cause the microcontroller to regulate voltage sent to the resistors based on incoming voltage, ambient temperature, and internal temperature of the housing, wherein the microcontroller is configured to monitor readings from the at least two temperature sensors and determine the ambient temperature based on the readings.

2. The heating system of claim 1, wherein the at least two temperature sensors include at least one elevated temperature sensor and at least one surface temperature sensor.

3. The heating system of claim 1, wherein the microcontroller is configured to monitor the incoming voltage from the vehicle and regulate the voltage sent to the resistors using pulse width modulation.

4. The heating system of claim 1, wherein the microcontroller is configured to overdrive the resistors when the internal temperature below a predetermined maximum temperature.

5. The heating system of claim 1, wherein the microcontroller is configured to store the ambient temperature as data in a non-volatile memory.

6. The heating system of claim 5, wherein the microcontroller is configured to calculate a delta value between the maximum temperature sensor reading and the minimum temperature sensor reading; and to use the last-stored data as the ambient temperature when the delta value is above a predetermined allowed maximum delta value.

7. The heating system of claim 1, wherein the microcontroller is configured to activate the resistors when the ambient temperature is determined to be below a predetermined threshold temperature.

8. The heating system of claim 7, wherein the predetermined threshold temperature is 10 degrees Celsius.

9. The heating system of claim 7, wherein the microcontroller is configured to activate the resistors at full power for a predetermined length of time.

10. The heating system of claim 9, wherein after the predetermined length of time, the microcontroller is configured to vary the voltage sent to the resistors to maintain a steady temperature above the freezing point of water.

11. The heating system of claim 1, further comprising a fail-safe whereby the internal temperature is prevented from increasing above a predetermined maximum temperature.

12. The heating system of claim 11, wherein the predetermined maximum temperature is 100 degrees Celsius.

13. The heating system of claim 1, wherein the resistors comprise wire wound or metal oxide resistors.

14. The heating system of claim 1, wherein the resistors comprise thick film resistors.

15. A heating system for an LED vehicle lamp having a housing and a lens, comprising:

at least two circuit boards positioned within the housing;

at least one LED mounted to a first circuit board;

a heating element mounted to a second circuit board, wherein the second circuit board is positioned adjacent to the lens, and wherein the heating element comprises at least two resistors configured to heat the lens from within the housing;

at least two temperature sensors mounted to the second circuit board, wherein the at least two temperature sensors include at least one temperature sensor positioned proximal to the heating element and at least one temperature sensor positioned distal to the heating element; and a microcontroller in communication with the resistors and the temperature sensors, and having stored thereon computer-executable instructions which, when executed, cause the microcontroller to regulate voltage sent to the resistors based on incoming voltage, ambient temperature, and internal temperature of the housing, wherein the microcontroller is configured to monitor readings from the at least two temperature sensors and determine the ambient temperature based on the readings.

16. The heating system of claim 15, further comprising one or more spacers configured to position the second circuit board with the resistors and the temperature sensors closer to the lens.

17. The heating system of claim 15, further comprising an inner lens optic and a lens optic holder positioned adjacent to the first circuit board.

* * * * *